US006608464B1

(12) United States Patent
Lew et al.

(10) Patent No.: US 6,608,464 B1
(45) Date of Patent: *Aug. 19, 2003

(54) INTEGRATED POWER SOURCE LAYERED WITH THIN FILM RECHARGEABLE BATTERIES, CHARGER, AND CHARGE-CONTROL

(75) Inventors: Ark L. Lew, Ellicott City, MD (US); Joseph J. Suter, Clarksville, MD (US); Binh Q. Le, Vienna, VA (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/884,714

(22) Filed: Jun. 30, 1997

Related U.S. Application Data

(63) Continuation-in-part of application No. 08/632,969, filed on Apr. 16, 1996, now Pat. No. 5,644,207.
(60) Provisional application No. 60/008,478, filed on Dec. 11, 1995.

(51) Int. Cl.$^7$ ................................................. H07J 7/00
(52) U.S. Cl. ........................ 320/107; 320/101; 320/108
(58) Field of Search ........................... 320/101, 107, 320/108; 429/61, 90

(56) References Cited

U.S. PATENT DOCUMENTS

| | | | | |
|---|---|---|---|---|
| 3,938,018 A | * | 2/1976 | Dahl | 320/2 |
| 4,709,202 A | * | 11/1987 | Koenck et al. | 320/43 |
| 4,740,431 A | * | 4/1988 | Little | 429/9 |
| 4,955,203 A | * | 9/1990 | Sundhar | 62/361 |
| 5,147,985 A | * | 9/1992 | DuBrucq | 174/260 |
| 5,192,947 A | * | 3/1993 | Neustein | 340/825.44 |
| 5,325,041 A | * | 6/1994 | Briggs | 320/44 |
| 5,448,110 A | * | 9/1995 | Tuttle et al. | 257/723 |
| 5,644,207 A | * | 7/1997 | Lew et al. | 320/3 |
| 5,665,490 A | * | 9/1997 | Takeuchi et al. | 429/192 |
| 5,747,968 A | * | 5/1998 | Merritt et al. | 320/119 |
| 5,788,178 A | * | 8/1998 | Barrett, Jr. | 244/3.11 |

OTHER PUBLICATIONS

Kazuo Murata, "An Overview of the Research and Development of Solid Polymer Electrolyte Batteries", Electrochimica Acta, vol. 40, Issue 13–14, Oct. 1995.*

* cited by examiner

Primary Examiner—Peter S. Wong
Assistant Examiner—Gregory J. Toatley, Jr.
(74) Attorney, Agent, or Firm—Francies A. Cooch

(57) ABSTRACT

A self-contained, small, lightweight, portable, renewable, modular integrated power source. The power source consists of a recharging means such as solar cells that are laminated onto a rechargeable energy source such as a solid state polymer battery which in turn is laminated onto a substrate containing circuits which manage the polymer battery charging. Charging of the battery can occur via solar energy or, alternatively, via RF coupling using external RF charging equipment or a hand held generator. For added support, the integrated power source is then bonded to an applications housing or structure. This integrated power source can independently power the electronic application. It can also serve as casing or housing by taking the shape of the application enclosure.

39 Claims, 11 Drawing Sheets

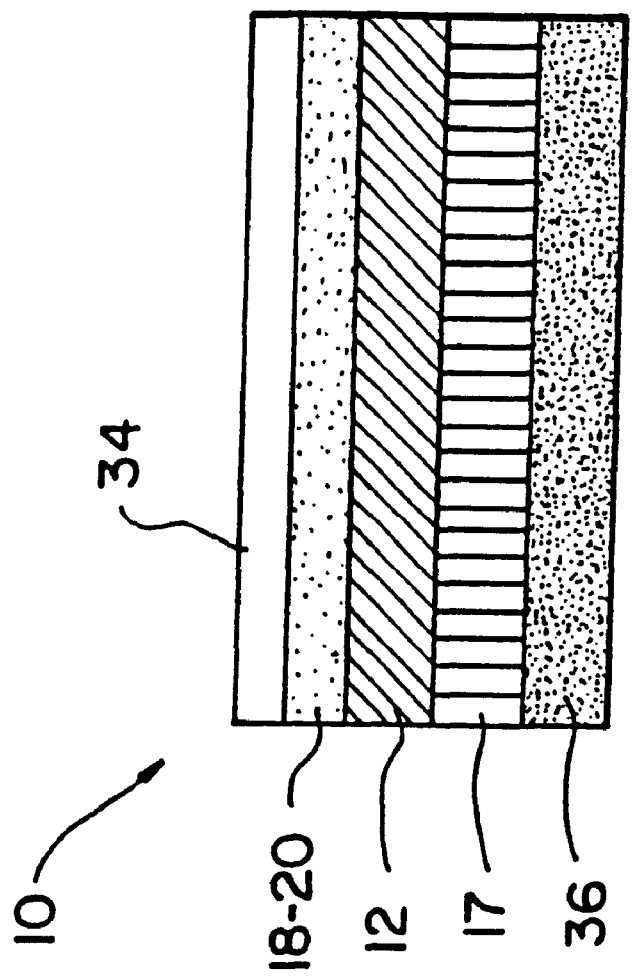

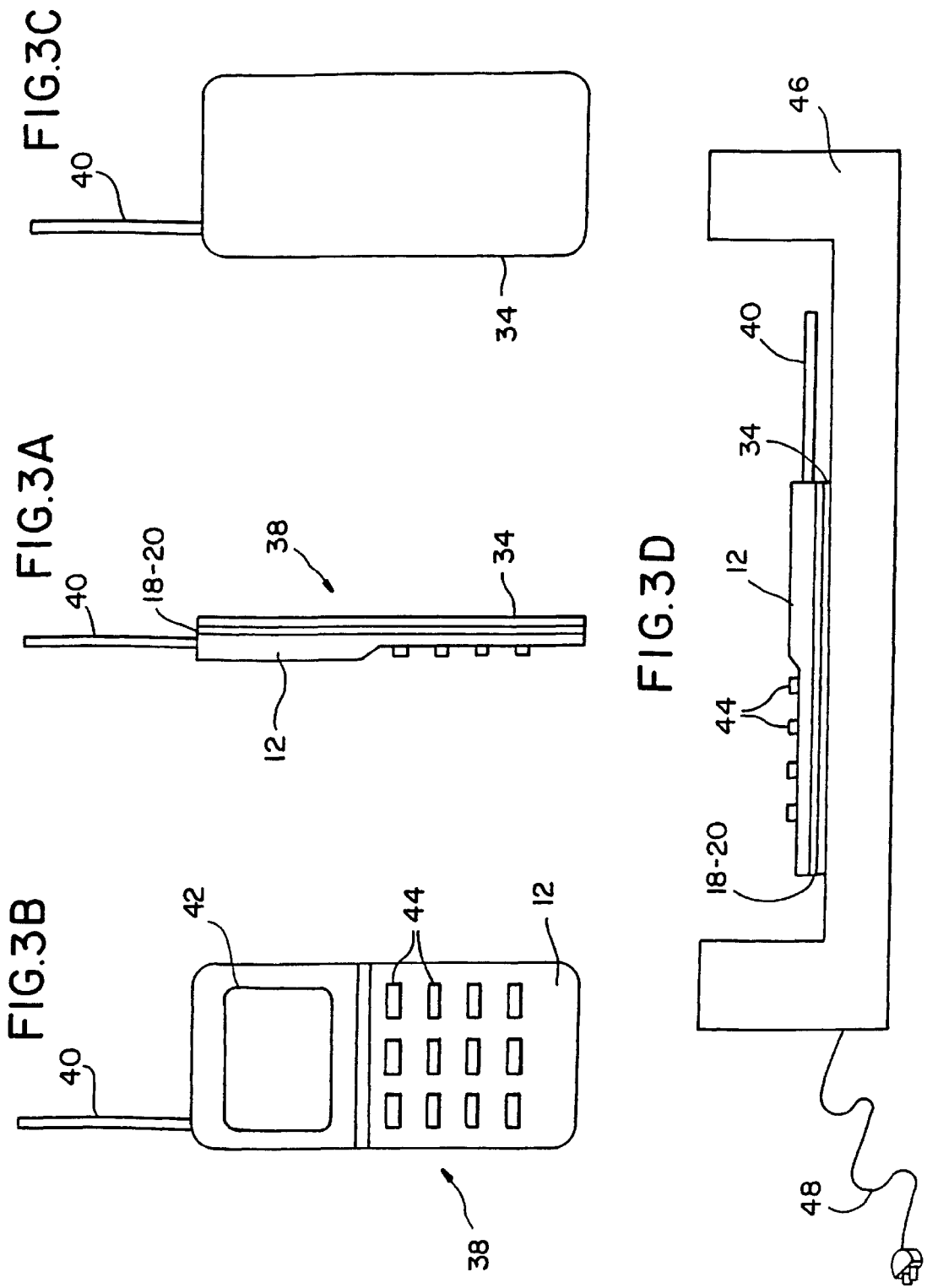

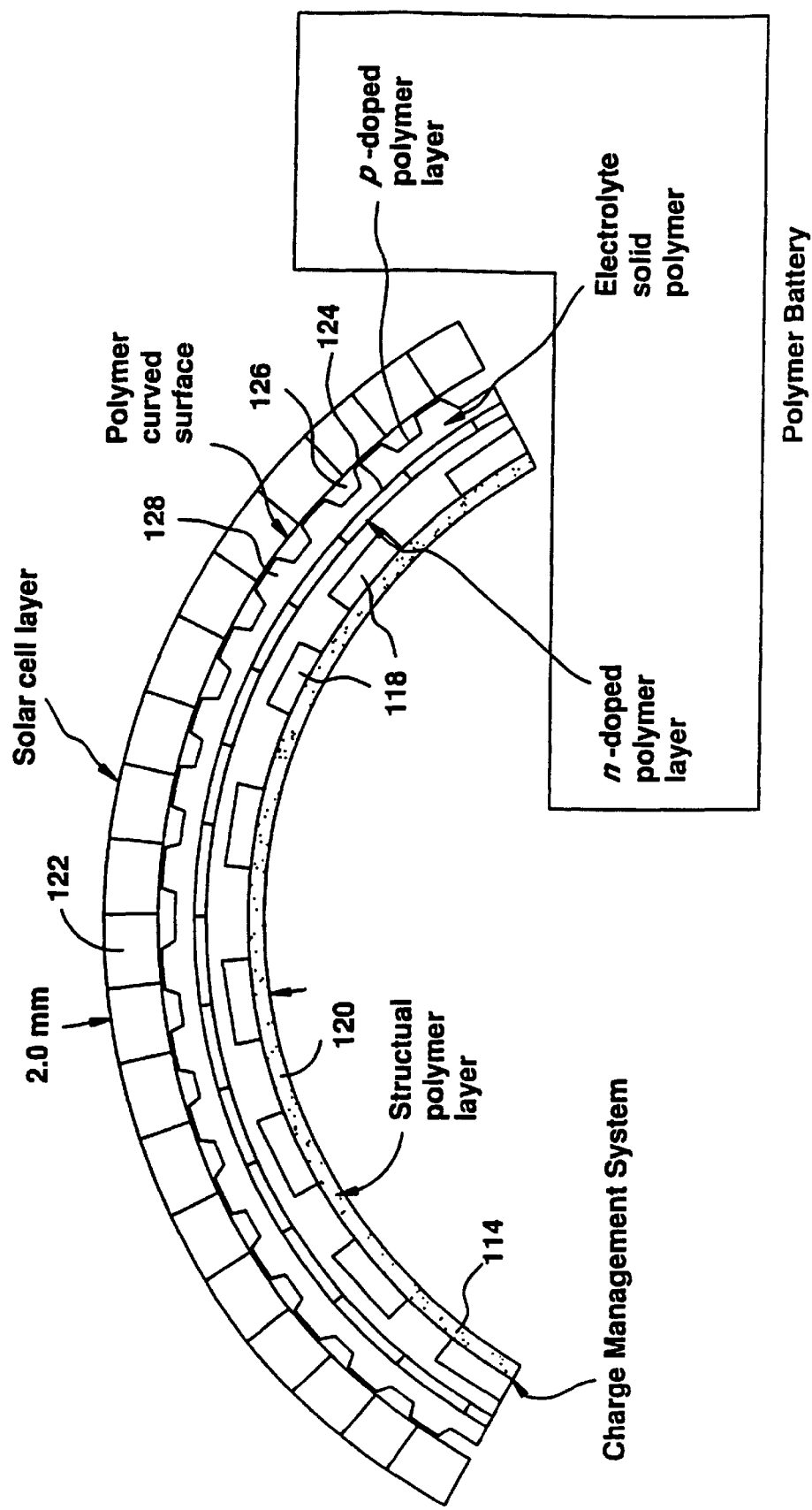

INTEGRATED POWER SOURCE LAYERED WITH THIN FILM RECHARGEABLE BATTERIES, CHARGER, AND CHARGE-CONTROL

This application is a continuation-in-part of application Ser. No. 08/632,969, filed Apr. 16, 1996, now U.S. Pat. No. 5,644,207, issued Jul. 1, 1997, which claimed the benefit of provisional application No. 60/008,478, filed Dec. 11, 1995.

STATEMENT OF GOVERNMENTAL INTEREST

The Government has rights in this invention pursuant to Contract No. FA8002-96-C-0301 awarded by the Department of the Air Force.

BACKGROUND OF THE INVENTION

1. Field of the Invention

The present invention relates to power supplies and, particularly, to a small, lightweight, portable, rechargeable and modular integrated power source of the solar cell variety.

2. Description of the Prior Art

With the ever expanding use of the conventional battery in many types of equipment which rely on batteries for electrical power, the advantages of a portable, renewable, self-contained power source which is integrated within applications are self-evident, especially if during actual delivery of current the changing of depleted battery cells is eliminated. A power-on-demand capability, where maintenance can be held to a minimum, is extremely attractive when supplying power to emergency communication equipment. Never having to replace batteries, for example, in walkie-talkie radios, modular cellular telephones, pagers, radios, data recording devices and other hand-held portable equipment, offers money-saving operations and consequently a lower cost. With the advent of environmentally friendly, form malleable polymer battery, technology now exists to design and develop self-contained, energy-renewable power sources for all types of portable applications.

One prior art power source battery is disclosed in U.S. Pat. No. 3,005,862 wherein a solar battery can have its elements shaped or curved to desired configurations. In one embodiment, the solar panel itself can form a wall of a satellite. The preferred material of which the panelling is made is aluminum, although other materials such as stainless steel, beryllium, magnesium, or titanium, or even plastic may be reduced to its essential elements. U.S. Pat. No. '862 merely demonstrates another way for mounting a solar battery.

U.S. Pat. No. 5,180,645 carries the principles of U.S. Pat. No. '862 one step further by recognizing the importance of providing an integrated battery into or part of an equipment housing. U.S. Pat. No. '645 is primarily directed, however, to a battery formed of first and second current collectors separated by a solid state electrolyte. FIG. 2 of U.S. Pat. No. '645 shows such a battery embedded in a radio housing with the traditional role of the housing as a separate element intact.

SUMMARY OF THE INVENTION

In accordance with the invention of a self-contained, energy renewable power source, recent advances in technology have centered on the following achievements:

1. Improved performance and stability of polymer anode and cathode materials such as polypyrrole through improved electrolytic drying procedures and processing conditions.
2. Incorporated solid polymer electrolytes in prototype all-polymer batteries and modified solvents used in preparation of electrolytes such as polyacrylonitrile to achieve improved electrolyte performance.
3. Expanded class of solids used as polymer anodes and cathodes to include promising candidate materials including redox-couple substituted thiophenes to achieve higher cell potentials and stability.

The recent developments, moreover, in polymer batteries now provide a technology in which a battery can be integrated within the mechanical supporting structure for an application circuit. No longer will conventional restraints require a battery as a separate add-on component thereby dispensing with the need for a separate battery compartment and the cables historically necessary to connect the power source to the electronic components. The invention further considers the development of a novel and unique integration of a polymer battery coupled with miniaturized integrated electronics. With the ability to take on a shape malleable to a particular application, an environmentally friendly polymer battery can potentially incorporate solar cells, SRAMS, DRAMS and IC's to provide power source and nonvolatile memory data collection and storage. In one preferred application, solar cells backed with a thin film polymer battery at the component level can supply a self-contained, lightweight, and fully integrated and energy renewable power source. Beyond the chip level, polymer batteries can be incorporated into devices as the mechanical backing and structures for multi-layer printed circuit board technology. In its most general sense, the nature of polymer battery technology is such that a chassis or housing can be molded into a desired shape using the battery material itself and still incorporate a power source for the intended application.

Many of the above advantages can also be obtained by combining the power management means of the invention with other types of batteries, e.g., lithium-ion, or with fuel cells such as hydrogen-oxygen or methane-oxygen.

The invention also comprises a method for assembling an integrated power source, the integrated power source comprising a rechargeable energy source, power management means and means for recharging the energy source, arranged in layers, the method comprising the steps of:

laminating the layers together to form a laminate structure such that external electrical interconnections are minimized; the laminate structure is resilient to vibration, shock, humidity and moisture; and thermal paths within the laminate structure are specified for thermal control; and sealing the laminate structure within an hermetically sealed enclosure.

An additional step in the method of the invention comprises, before the laminating step, the step of inserting a layer of a structural composite between the other layers comprising the integrated power source.

Accordingly, an object of the invention is to assemble a polymer battery as the structural casing of an electronic unit so that interconnecting wires between the battery, a charging unit, and a regulating circuit are eliminated.

Another object of the invention is a power source consisting of solar cells, RF charging unit or microwave energy charging means which are integrated structurally with a polymer battery.

Yet another object of the invention is the integration of a polymer battery as the principal structural element in the formation of a solar-powered electronic unit.

A further object of the invention is an implementation for integrated power management electronics offering voltage regulation, under/over voltage control, under/over current control and polymer battery charging control utilizing polymer and other semiconductor circuitry.

Still another object of the invention is an integrated power source stacked on top of the integrated power management circuit layer which incorporate additional applications circuitry such as SRAM (static random access memory), DRAM's (dynamic random access memory) for data storage purposes.

Yet another object of the invention is to laminate an integrated applications electronics layer onto the integrated power source thereby implementing miniaturization beyond the volumetric reduction gained by housing an applications board within an integrated power source enclosure.

Another object is a power source which combines on a layered p or n- doped polymer substrate resistive, capacitive components, semiconductors laminate layer on to another layer consisting of the solid polymer battery, all integrated onto a base material to provide a structural shell for an electronics unit.

Other objects and advantages of the invention will become apparent to those skilled in the art in the course of the following description.

BRIEF DESCRIPTION OF THE DRAWINGS

FIG. 2 shows the integrated power source of FIG. 1 but depicting the individual laminations and their structural relationship to each other.

FIGS. 3(a)–3(d) shows the integrated power source of the invention as applied to a conventional cordless telephone system.

FIG. 13 is a partial cross section of the view in FIG. 12 to highlight the layered construction of the invention.

The same reference characters refer to the same elements throughout the several views.

DETAILED DESCRIPTION OF THE PREFERRED EMBODIMENT

Figure 1:
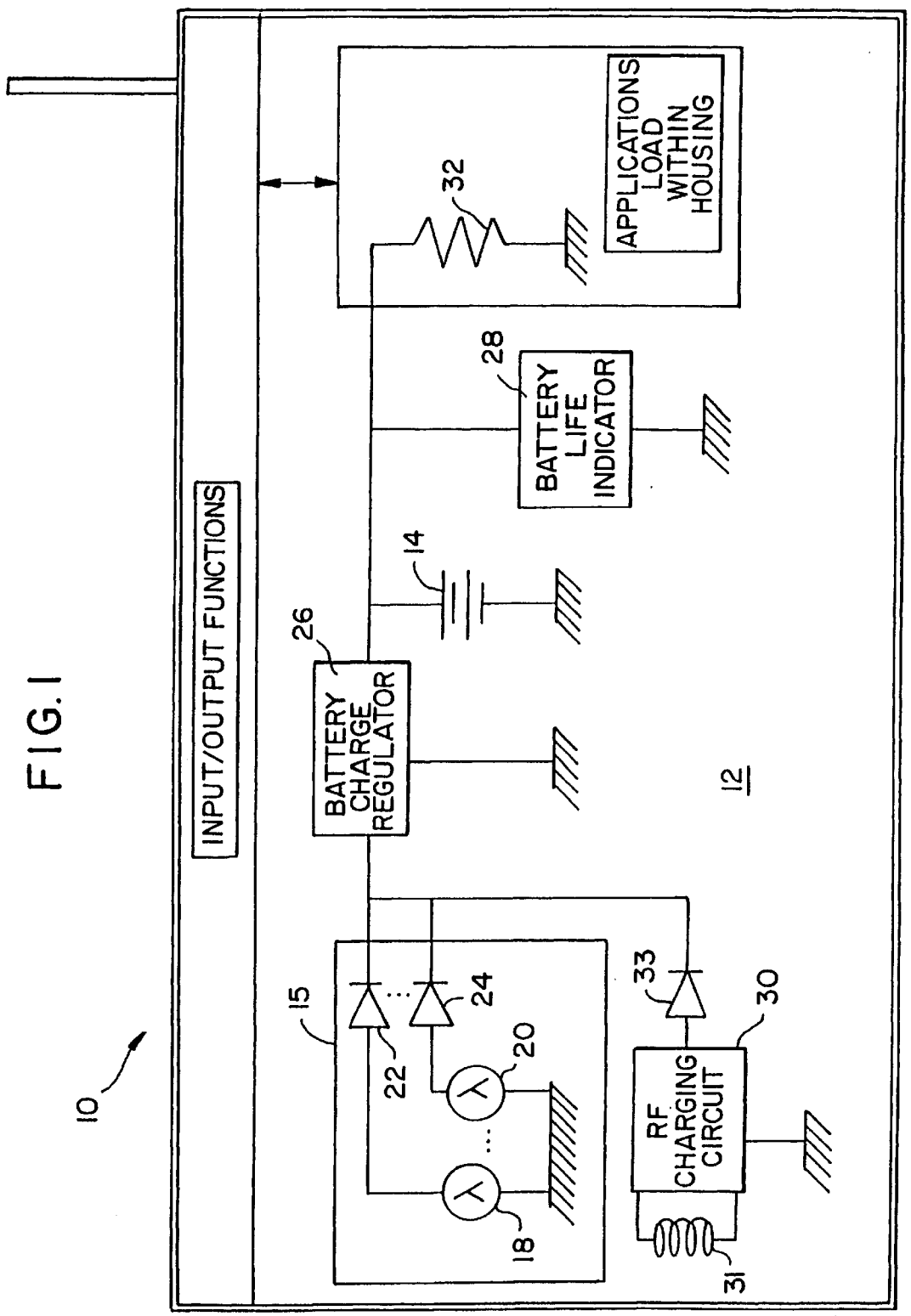
FIG. 1 shows one form of the integrated power source embodying the invention.

Referring now to FIG. 1, an integrated power source is indicated generally by the reference numeral 10 and includes as one of its components an essentially flat, planar and malleable polymer battery 12 which offers structural support for a plurality of electronic components of eclectic choice. Instead of a polymer battery other rechargeable energy sources that can be used in the invention include other types of batteries, e.g., lithium-ion, or fuel cells such as hydrogen-oxygen or methane-oxygen. Battery 12 may be any one of a number of solid state polymer batteries which have existed in the art for several years. One type of polymer battery believed to be appropriate for use in connection with the device illustrated in FIG. 1 is described and claimed in U.S. patent application Ser. No. 08/527,598 entitled "A Completely Polymeric Charge Storage Device and Method for Producing Same", filed Sep. 15, 1995, and assigned to the assignee of the instant application. It will thus be understood that battery 12 will comprise in a preferred form an ionically conducting gel polymer electrolyte layer separating opposing surfaces of electronically conducting conjugated polymeric anode and cathode elements supported on a lightweight porous substrate. Symbolically in FIG. 1, the electrical function of battery 12 is represented by the conventional symbol 14. Battery 12 thus will be understood to comprise the main power source which will power the stack and the applications load.

Other components selected for incorporation into the integrated power source of FIG. 1 include the following elements: a solar energy system 15 which comprises an array of conventional solar cells two of which 18 and 20 are shown connected by diodes 22 and 24, respectively, to a battery charge regulator 26, an optional battery life indicator 28, an RF charging circuit 30 connected between coil 31 and diode 33, and an internal applications load shown as consisting of a resistor 32. The representative solar cells 18 and 20 can be in rigid form or flexible form depending on the application requirement. As will be appreciated, solar energy system 15 converts solar energy to electrical energy and typically would be expected to deliver electrical current to a battery, such as the battery 14.

The actual physical characteristics of integrated power source 10 may best be appreciated by reference to FIG. 2. The polymer battery 12, the solar cells 18 and 20, and the polymer semiconductor circuitry 17 comprising the regulator 26, the indicator 28, charging circuit 30, and applications load resistor 32 have previously been discussed in connection with the device shown in FIG. 1. Capping the device in direct abutting relationship with one side of the solar cells is a protective cover 34 transparent to solar radiation and having the primary function of protecting the solar cells from physical damage. Cover 34 may advantageously incorporate if desired an infrared filter in an effort to reduce to a minimum heat buildup in the integrated power source caused by infrared heating. Supporting the integrated power source 10 and in direct abutting relationship with one side of the polymer semiconductor circuitry 17 is a base structure material 36. The base material adds an optional foundation for supporting integrated power source 10 and it has, if desired, such optional uses as electrical isolation, electrical grounding, and antenna for the stack when required. Base material 36 equally can be a separate layer or be integrated with the layers above it.

From the description of the invention to this point, it will be appreciated that the integrated power source embodying the invention results in a self-contained, thin, lightweight, modular, easily portable, and renewable source of power with diverse application in such fields as telecommunications equipment, portable tools, portable PC's, vehicles, crafts, spacecraft, consumer electronics and toys. It will be evident that no separate enclosure or battery compartment is required since the source of electrical current readily is fed to polymer battery 12 from solar energy system 15. The capacitance, resistors, diodes and other electronic components are placed on the polymer substrate, or made part of the substrate to implement the charging circuit of battery 12. Alternatively, the electronics components layer may be implemented by other technologies such as by adopting chip-on-board techniques. That is, interconnections can be expected to be traces on the substrate between the solar cells, charging circuits and battery 12 for electrical power flow between them. Being highly malleable, the integrated power source 10 has the ability to be adapted to multiple configurations thus being able to take the shape of any desired application housing. It thus has the flexibility to be molded across structural members like spacecraft tubing, spacecraft (such as side to bottom) panels, solar panels, spacecraft linkages, and propellant tanks. With prudent utilization, and periodic access to solar radiation, power exhaustion in all likelihood should never occur.

Referring now to FIG. 3(*a*), the integrated power source 10 is shown applied to a hand-held transceiver, generally designated 38, of a conventional cordless telephone system. In the side view of transceiver 38 as shown in FIG. 3(*a*), the transceiver incorporates protective cover 34, solar cells 18 and 20 layered under the cover, and polymer battery 12 not only shaped or molded to conform to the design of transceiver 38 but completely enveloping the transceiver except, as shown in front and back views **3(*b*) and 3(*c*), for necessary perforations which accommodate an antenna 40, viewing screen 42, and conventional push buttons 44. From the foregoing description, it will be understood that the mottled areas 12** as they appear in FIGS. 3(*a*) and 3(*b*) represent the polymer battery 12 as a flexible polymer material that is either n or p-doped functioning either as cathode or anode material with the solar cells converting photons into charge carriers in the doped polymer material which will give rise to an electrical current. The casing of transceiver 38, in the example given, thus will be composed of the entire integrated power source itself, thereby dispensing with any underlying structural frame and disposing entirely of battery compartment or enclosure routinely encountered in contemporary and conventional remote communication systems.

The advantageous features of the invention described hereinabove thus appear in the assembly of a polymer battery which not only provides solar-converted electrical energy to an electronic unit but simultaneously serves as the structural casing or core of the electronic unit itself. Typical conventional interconnecting wires extending between the battery, a charging circuit, and a regulating circuit can be entirely eliminated since the present invention anticipates that polymer semiconductor circuitry 17 will consist of integrated circuits, discrete devices, memory devices, which in conjunction with the polymer battery powers an application load. By integrating a flexible and malleable polymer battery as the principal structural shell of a solar-powered electronic unit, power should never run out with prudent utilization, battery replacement per se becomes a thing of the past, and the resulting reduction in weight and volume effect important economic savings in application packaging design.

Considering FIG. 3(*d*) in detail, an alternative source of power to solar radiation is provided by an RF charging cradle 46 which is connected by means of a conventional power cord 48 to a 110–120 v outlet (not shown). In operation, therefore, the choice exists of charging polymer battery 12 via either the RF charging circuitry through inductive coupling of energy from the charging cradle 46, noninvasively via coupling coil 31 which is integrated on the polymer battery, or by current output when the solar cells are exposed to solar radiation.

Figure 4A:
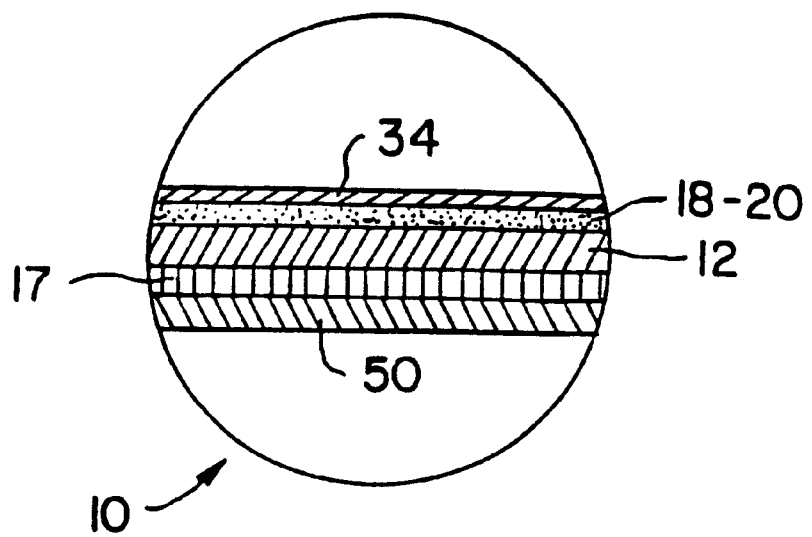
FIG. 4 shows an application of the integrated power source of the invention to a vehicle such as a passenger automobile.
Figure 4B:
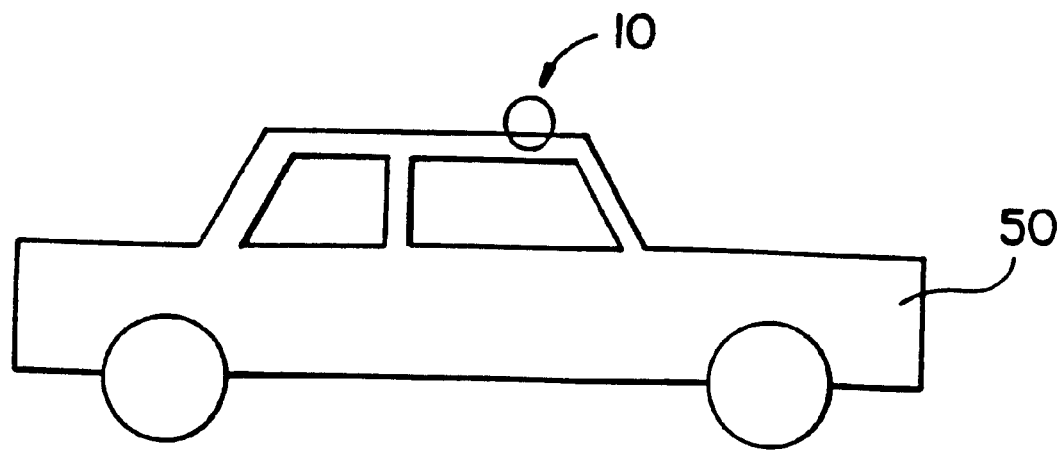

Turning now to a discussion of FIG. 4, the integrated power source 10 of FIG. 1 is laminated onto the structure of an automobile 50 for providing continuous power renewal during times when the vehicle is under exposure to solar radiation.

Figure 5:
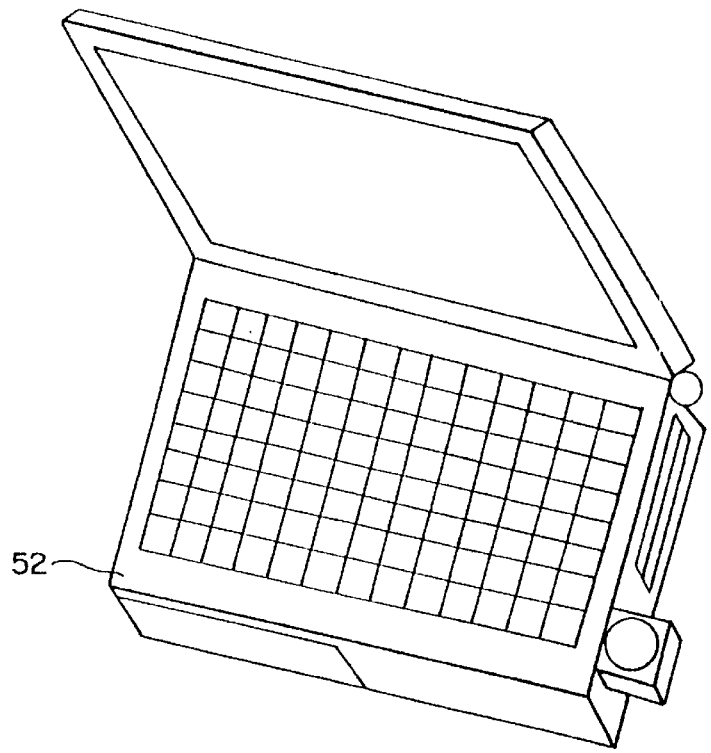
FIG. 5 shows an application of the integrated power source of the invention to a lap top computer.

In FIG. 5, the integrated power source is shown applied to a lap top electronics unit 52 which incorporates polymer battery 12 as the shell or casing, thus eliminating the additional bulk of the battery compartment conventionally imposed by prior art structural enclosures to support the display panel and operating controls.

Figure 6:
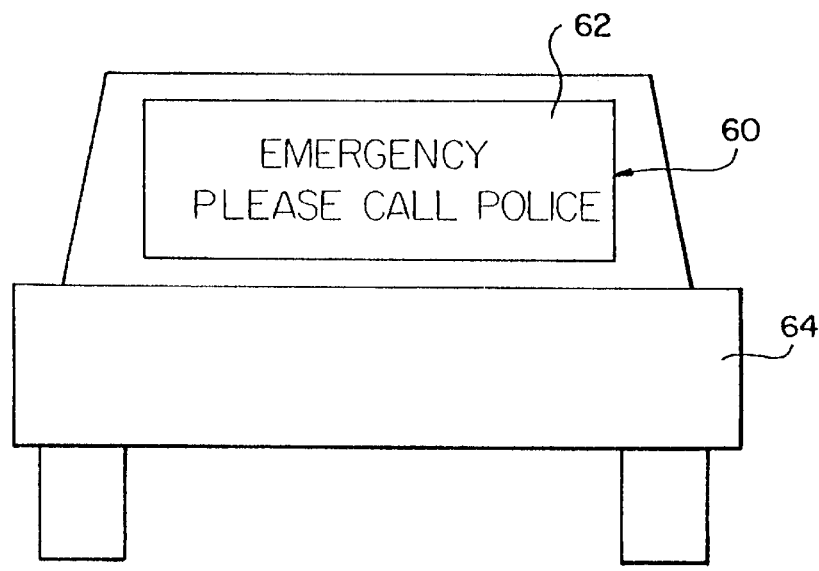
FIGS. 6, 7 and 8 show, respectively, applications of the integrated power source of the invention to an emergency sun shield message communication wireless panel, a residential or commercial structure such as a building or the like, and highway signs.

In the device shown in FIG. 6, a sun shield panel 60 is shown mounted on the rear window 62 of a vehicle 64. The polymer battery 12, solar cells 18–20, and various charging circuits are represented by the mottled area shown covering the window 62. Through the use of an integrated wireless transmitter and light emitting diodes (not shown) the panel 60 may provide emergency communication wireless calls for assistance and also a lighted display of messages in darkness and thereby transmit customized electronic distress signals regardless of lighting conditions. For this to occur, it will be appreciated that the panel will absorb light energy during the day to charge up the panel battery which can provide power during extended periods of darkness.

Figure 7A:
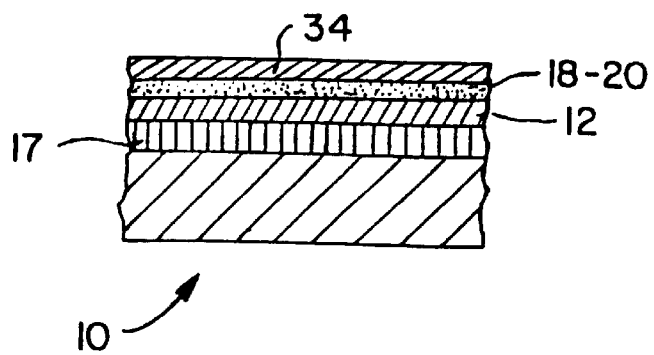
Figure 7B:
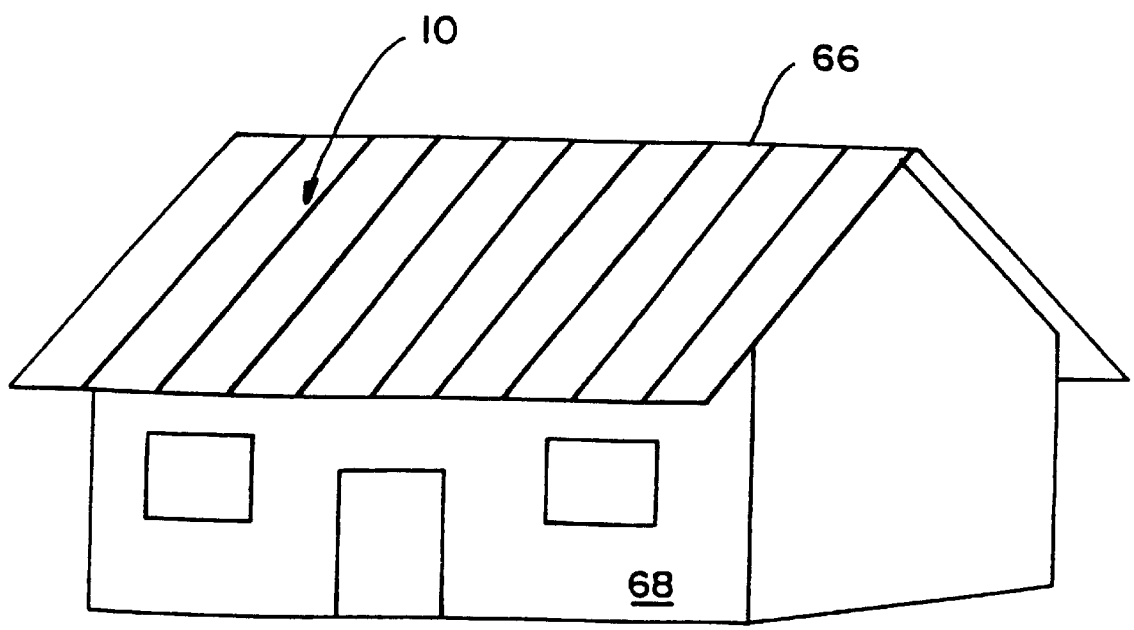

Considering now FIG. 7, the integrated power source 10 of FIG. 1 is applied to cover the roof 66 of a building 68 such as a dwelling, factory or the like. The integrated power source 10, of course, as shown in the inset, includes cover 34, solar cells 18–20, polymer battery 12, the polymer semiconductor circuitry 17, all mounted on the base structure material provided by the building 68. The roof top design, with proper industrial sizing and planning, anticipates obviating the need for a utility company power hook up in remote areas. Other benefits of the roof top incorporation of the integrated power source of the present invention include its use as an auxiliary power source for energy saving.

Figure 9:
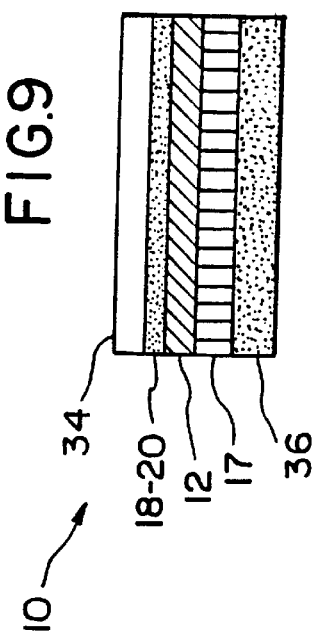
FIG. 9 is a sectional view taken along the lines IX—IX of FIG. 8, both signs pictured being represented.
Figure 8:
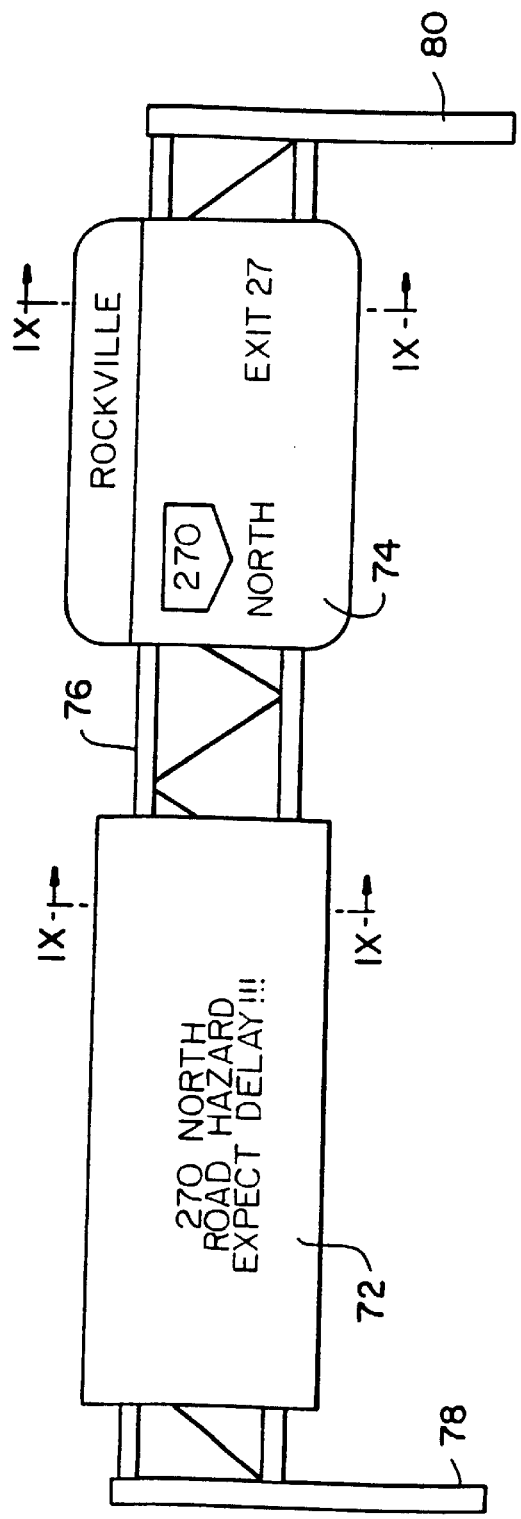

In the application of the invention embodiment shown in FIG. 8, signs 72 and 74 are supported by a roadside support 76 having posts 78 and 80 anchored to the ground and are equipped to deliver commandable electronic directional and or highway-related messages to vehicles passing in the vicinity of the signs. Rather than illuminate the signs during darkness by conventional means such as alternating current or standby emergency battery power, signs 72 and 74 both incorporate the integrated power source 10 described earlier in connection with FIGS. 4–7. Accordingly, it will be understood from an examination of FIG. 9 that each sign 72 and 74 has a construction which not only is in accordance with the invention, but has been described in detail in connection with the operation given for the embodiment shown in FIG. 2. Also, the integrated power source can be utilized to power remotely placed sensor and communications equipment in support of future intelligent highways.

The integrated power source of the present invention can also be designed to operate with a memory storage devices made up of optional dynamic random access memory (DRAM) and static random access memory (SRAM) that can be programmed for long term data retention which results in nonvolatility of the stored data. In addition to the two methods for charging the battery 12 described hereinabove, the present invention offers a third method utilizing a manually operated electrical generating charging device under emergency conditions such as might be encountered by prolonged periods of darkness or the absence of conventional wall outlet power. An integrated power source containing these features is shown in the block diagram of FIG. 10.

Figure 10:
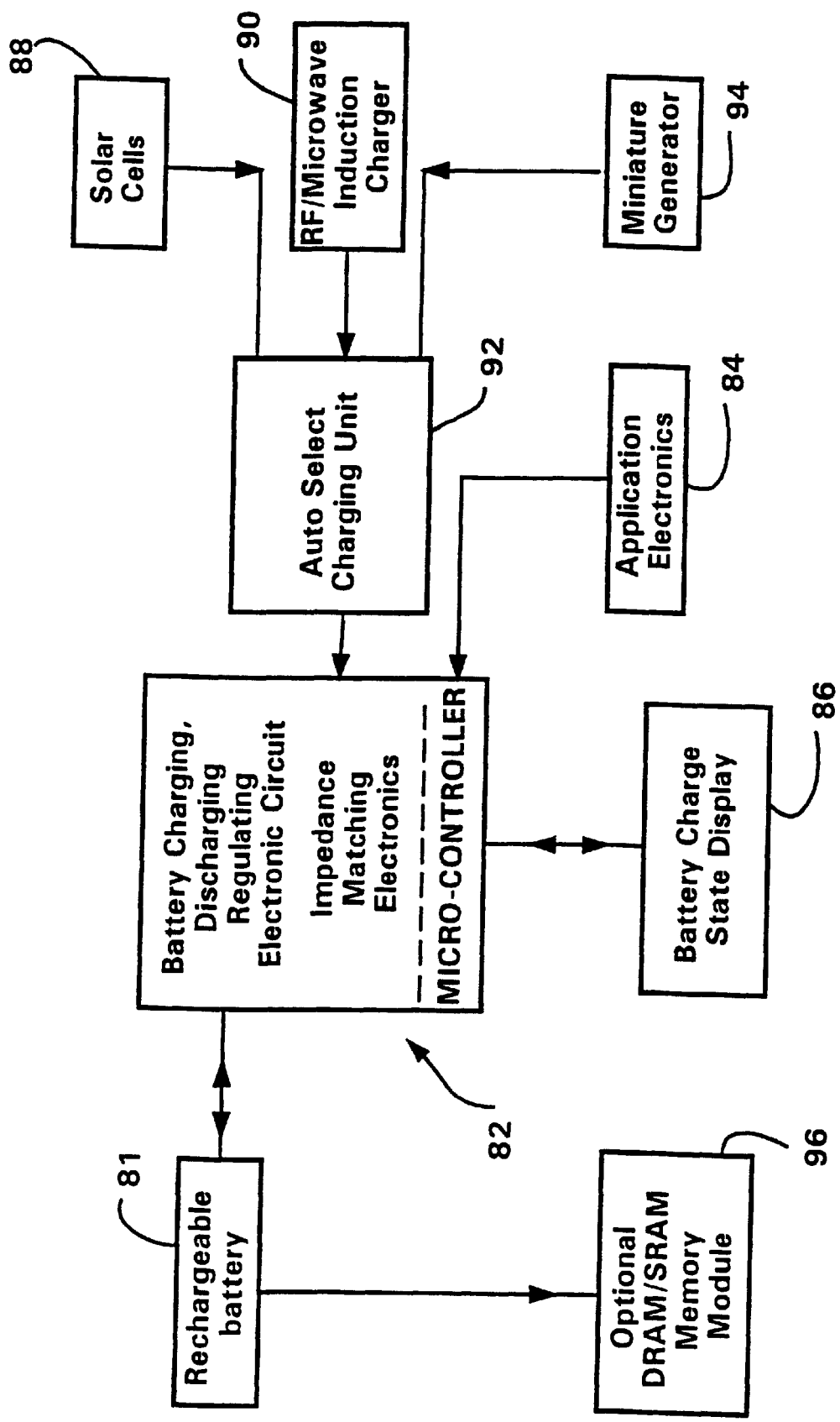
FIG. 10 is a block diagram of a circuit which carries out the operation of the integrated power source of the invention.

As shown in FIG. 10, a rechargeable battery 81 of the polymer type hereinabove described is under the control of a micro-controller generally designated 82 which contains conventional battery charging, discharging, and regulating circuits to accommodate a range of voltage outputs whose selection is based on the voltage demands of the system. Optionally, but not shown, micro-controller 82 may in addition contain circuitry well known in the art for protecting battery 81 against the damage from inadvertent reverse polarity. That is, the reverse polarity circuit may consist of semiconductors such as diodes which prevent damage to the circuit when the rechargeable battery is inadvertently connected in such a way that the positive and negative terminals are interchanged. Application electronics 84 may be considered to be the equivalent of the polymer semi-conductor circuitry 17 described in connection with the several applications shown in FIGS. 4–9. Likewise, battery charge state display 86 is the equivalent of the battery life indicator 28 shown in FIG. 1 and the solar cells 88 and induction charger 90 have also been described in depth in connection with FIGS. 1 and 3, respectively. Selection of the source of the current to be delivered to battery 81 is under the control of auto select charging unit 92 having a third input from miniature generator 94. Auto select charging unit 92 may be internally configured to accept electrical current for charging battery 81 from any one of the three sources, or from all three simultaneously. Generator 94 may assume various forms well known to those skilled in the art but, in the embodiment shown in FIG. 10, one form of miniature generator can be a hand-held generator that consists of a motor, a gear assembly, a flywheel, a one-way clutch and an input motion trigger. Movement of the input trigger will generate an amplified circular motion of the motor shaft through the gear assembly. When the motor shaft turns, it will generate a magnetic field through the motor coils. This magnetic field will then provide a potential voltage and current at the motor terminals that can be used for charging of the battery. The input motion can be a linear or a circular motion. A DRAMS/SRAMS memory module 96 optionally may be connected to battery 81 to store in digital form data concerning various operational characteristics of battery 81. Operational characteristics of the applications circuitry and data gathered from the applications circuit can also be stored in the nonvolatile memory.

Figure 11:
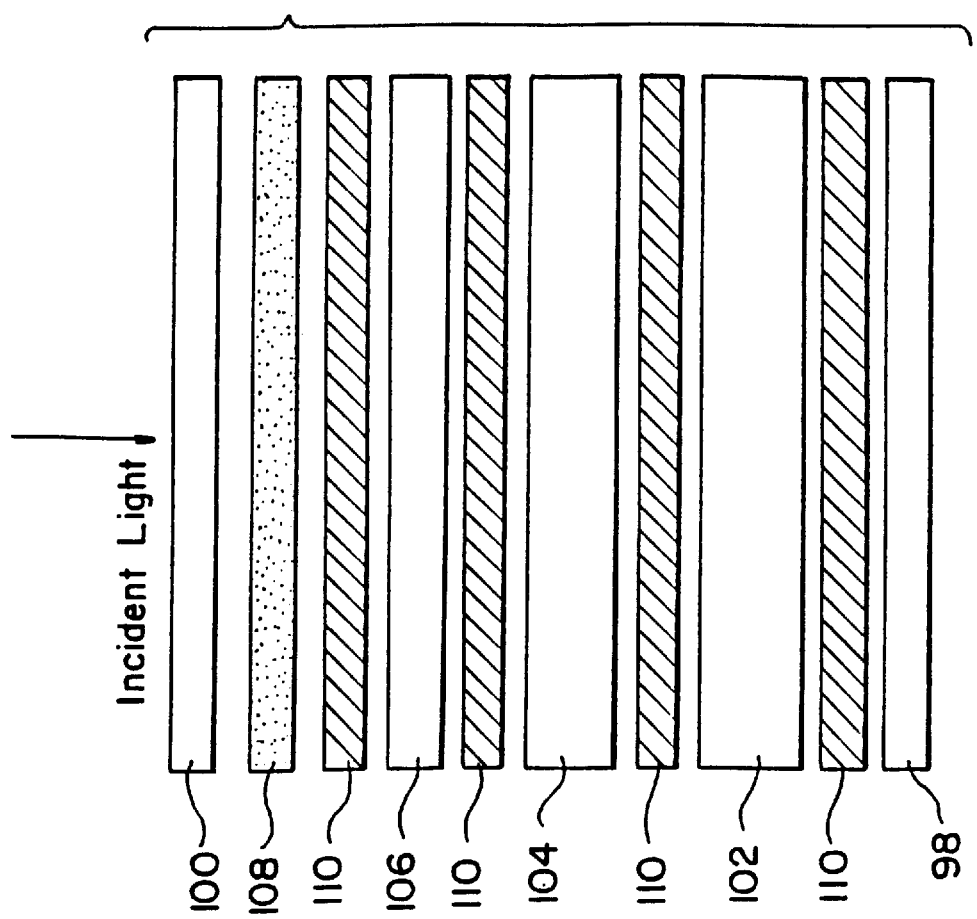
FIG. 11 is a cross section of multiple laminations showing an alternate embodiment of the integrated power source of the invention.

FIG. 11 shows another and somewhat more extensive arrangement of the integrated power source of the present invention which offers greater resistance to mechanical impact and protects against abrupt changes in atmospheric pressure. Referring now to FIG. 11, the integrated power source is made up of multiple layers of laminations arranged in a predetermined order inside to outside beginning with a battery charge state display 98 and ending with a protective transparent cover 100. Next of the electronic components in the order shown between the two outer laminations are optional DRAMS/SRAMS memory module 102, rechargeable battery 104, battery electronics 106, and an array of solar cells 108. Sandwiched between the solar cells 108 and battery electronics 106, between battery electronics 106 and battery 104, between battery 104 and optional DRAMS/SRAMS memory module 102, and between optimal DRAMS/SRAMS memory module 102 and battery charge state display 98 are layers of structural composite 110. The presence of the structural composite layers 110 contributes to the overall rigidity of the integrated power source thus making it less vulnerable to mechanical impact and sudden pressure decompression especially in those applications where the integrated power source serves as the housing structure of an operational device. It will be appreciated, of course, that the number of the composite layers 110 may be reduced, or the number kept the same and their thickness made a matter of adjustment, until the optimum value of structural rigidity of the integrated power source has been attained.

Figure 12:
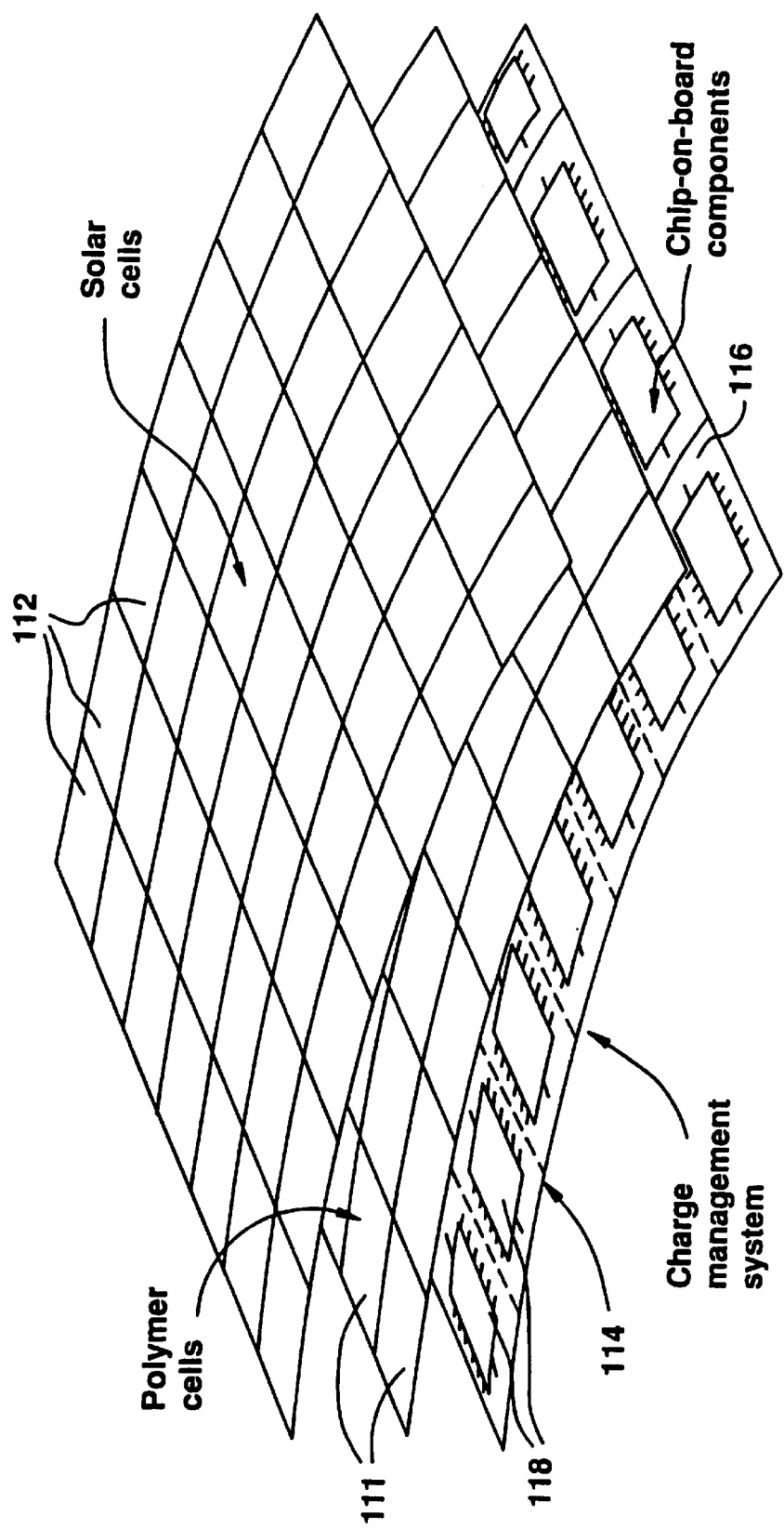
FIG. 12 is an exploded view of several components which form part of the integrated power source embodying the invention.

Referring now to FIG. 12, the exploded view of several components which form the basis of the integrated power source embodying the invention will now be described. As shown, a plurality of polymer cells 111 representing the battery 12 of FIG. 1 consist as described hereinabove of an all polymer anode and cathode and a conductive polymer electrolyte. These cells will generally be placed on a plastic substrate (not shown) and have been found to create a potential difference of approximately 2.5 volts. The polymer cells may be arranged in series with other cells where higher potential differences are necessary or arranged in parallel with each other when a larger current must be supplied. The polymer cells 111, in the arrangement shown in FIG. 12, are sandwiched between a plurality of solar cells 112 for the conversion of solar energy into electrical current and a charge management system, generally indicated 114, whose main component, a flexible circuit board 116, acts as the support for a plurality of chip-on-board components 118. The charge state of the polymer cells may be monitored by the charge management system.

The charge management system 114 encompasses the use of chip-on-board components 116 which function as a system for regulating, monitoring, and controlling the charge applied to polymer cells 111. System 114 may also function as a diagnostic tool for indicating the state of charge and the rate of charge on polymer cells 111. As will.therefore be appreciated, by internal connections conveniently made at the time of manufacture, the voltage output of the polymer cells 111 may be made to vary from 2.5 volt (one cell) to $\eta$ times 2.5 volts. It further will be understood that the cells 111 may be switched from a series to a parallel arrangement when necessary to obtain higher discharge current at a constant voltage.

Referring now to FIG. 13, its principal value lies in furthering an understanding of the outstanding flexibility and malleableness of the integrated power source of the invention. In the form shown, chip-on-board components 118 are affixed to and supported by a structural polymer layer 120. Sandwiched between a solar cell layer 122 and the charge management system 114 are a plurality of polymer cells each represented in FIG. 13 by an $\eta$-doped polymer layer 124, a p-doped polymer layer 126, and a polymer gel electrolyte 128 positioned between the electrodes. As light is converted to electrical power by the solar cell layer 122, this power is transported to the chip-on-board components 118 in the charge management system. The total thickness of the layered components shown in FIG. 13 is expected to be on the order of approximately 2.0 mm.

It will be understood that the invention is not limited to the embodiments described above, it being apparent to those skilled in the art that various changes and modifications can be made without departing from the spirit of the invention or the scope of the appended claims.

We claim:

1. An integrated power source comprising:

an all polymer battery; and semiconductor circuitry integrated with the battery for implementing power management functions.

2. The integrated power source as recited in claim 1, wherein the semiconductor circuitry is implemented using chip-on-board components.

3. The integrated power source as recited in claim 1, further comprising energy charging means for delivering electrical current to the battery.

4. The integrated power source as recited in claim 3, wherein the semiconductor circuitry includes means for selecting between multiple energy charging means.

5. The integrated power source as recited in claim 3, wherein the battery, the semiconductor circuitry, and the energy charging means are laminated together to form a laminate structure.

6. The integrated power source as recited in claim 5, further comprising applications electronics laminated to the laminate structure.

7. The integrated power source as recited in claim 5, wherein the integrated power source is malleable for forming and functioning as different structural configurations.

8. The integrated power source as recited in claim 7, further comprising a base structure material.

9. The integrated power source as recited in claim 8, wherein the base structure material has a particular structural configuration, the laminated battery, semiconductor circuitry, and energy charging means being laminated to and assuming the configuration of the base structure material.

10. An integrated power source comprising:

a rechargeable energy source; and power management means integrated with the energy source.

11. The integrated power source as recited in claim 10, further comprising means for recharging the energy source.

12. The integrated power source as recited in claim 11, wherein the power management means includes means for selecting between multiple recharging means.

13. The integrated power source as recited in claim 11, wherein the rechargeable energy source is a fuel cell.

14. The integrated power source as recited in claim 11, wherein the rechargeable energy source is a battery.

15. The integrated power source as recited in claim 14, wherein the battery, the power management means, and the recharging means are laminated together to form a laminate structure.

16. The integrated power source as recited in claim 15, further comprising applications electronics laminated to the laminate structure.

17. The integrated power source as recited in claim 15, wherein the integrated power source is malleable for forming different structural configurations.

18. The integrated power source as recited in claim 17, wherein the power management means includes means for regulating and managing the charge delivered to the battery.

19. The integrated power source as recited in claim 18, wherein the power management means is programmable.

20. The integrated power source as recited in claim 19, wherein the power management means further includes a memory module for storing, in digital format, data concerning operational characteristics of the battery.

21. The integrated power source as recited in claim 20, wherein the power management means can accommodate a range of voltage outputs.

22. The integrated power source as recited in claim 21, wherein the power management means further includes means for matching the internal impedance of the battery.

23. The integrated power source as recited in claim 22, wherein the power management means further includes means for protecting the battery against reverse polarity.

24. The integrated power source as recited in claim 23, wherein the power management means further includes a display connected to the regulating the charge means.

25. The integrated power source as recited in claim 24, wherein the recharging means comprises an array of solar cells.

26. The integrated power source as recited in claim 24, wherein the recharging means comprises an RF charging means.

27. The integrated power source as recited in claim 24, wherein the recharging means comprises a microwave charging means.

28. The integrated power source as recited in claim 24, wherein the recharging means comprises an electrical generating charging means.

29. An integrated power source comprising:

an all polymer battery, and power management means integrated with the battery;

wherein the integrated power source is malleable for forming different structural configurations.

30. The integrated power source as recited in claim 29, further comprising energy charging means for delivering electrical current to the battery.

31. The integrated power source as recited in claim 30, wherein the power management means comprises means for selecting between multiple energy charging means.

32. The integrated power source as recited in claim 31, wherein the power management means further comprises means for regulating and managing the charge delivered to the battery.

33. The integrated power source as recited in claim 32, wherein the power management means is programmable.

34. The integrated power source as recited in claim 33, wherein the power management means further comprises a memory module for storing, in digital format, data concerning operational characteristics of the battery.

35. The integrated power source as recited in claim 34, wherein the power management means can accommodate a range of voltage outputs.

36. The integrated power source as recited in claim 35, wherein the power management means further comprises means for matching the internal impedance of the battery.

37. The integrated power source as recited in claim 36, wherein the power management means further comprises means for protecting the battery against reverse polarity.

38. The integrated power source as recited in claim 37, wherein the power management means is implemented using chip-on-board components.

39. The integrated power source as recited in claim 38, wherein the battery, the power management means, and the energy charging means are laminated together to form a laminate structure.

* * * * *